(12) United States Patent
Park

(10) Patent No.: US 8,186,604 B2
(45) Date of Patent: May 29, 2012

(54) THERMOSTAT APPARATUS

(75) Inventor: Hee Wan Park, Seoul (KR)

(73) Assignees: Fuji Bellows Co., Ltd., Kanagawa (JP); Corea Electronics Corporation, Chungcheonbuk-do (KR)

( * ) Notice: Subject to any disclaimer, the term of this patent is extended or adjusted under 35 U.S.C. 154(b) by 737 days.

(21) Appl. No.: 12/224,825

(22) PCT Filed: Feb. 22, 2007

(86) PCT No.: PCT/JP2007/053327
§ 371 (c)(1),
(2), (4) Date: Feb. 24, 2009

(87) PCT Pub. No.: WO2007/108273
PCT Pub. Date: Sep. 27, 2007

(65) Prior Publication Data
US 2010/0012738 A1    Jan. 21, 2010

(30) Foreign Application Priority Data

Mar. 17, 2006 (JP) ................................. 2006-075454
Sep. 15, 2006 (KR) ........................ 10-2006-0089388

(51) Int. Cl.
*F01P 7/16* (2006.01)
(52) U.S. Cl. ..................................... 236/34.5; 236/99 J
(58) Field of Classification Search .................... 236/34, 236/34.5, 93 R, 100, 99 J, 101 C
See application file for complete search history.

(56) References Cited

U.S. PATENT DOCUMENTS

| 5,979,778 | A  | * | 11/1999 | Saur | ............................. 236/34.5 |
| 6,457,652 | B1 | * | 10/2002 | Fukamachi et al. | ......... 236/34.5 |
| 6,915,958 | B2 | * | 7/2005  | Colas et al. | ................... 236/34.5 |
| 7,445,161 | B2 | * | 11/2008 | Inoue | ........................ 236/101 C |

* cited by examiner

*Primary Examiner* — Marc Norman
(74) *Attorney, Agent, or Firm* — Wenderoth, Lind & Ponack, L.L.P.

(57) ABSTRACT

An apparatus includes a movable temperature sensing member capable of sensing mainly the temperature of high-temperature coolant flowing in from a high-temperature coolant port and driving toward the side of the high-temperature coolant port in dependence upon the sensed temperature; a main valve fitted integrally to the movable temperature sensing member and constructed so as to render a low-temperature coolant port and a mixing compartment openable in conformity to the driving of the movable temperature sensing member toward the side of the high-temperature coolant port, thereby controlling the inflow rate of low-temperature coolant from the low-temperature coolant port to the mixing compartment; and a high-temperature coolant inducing part communicating with the high-temperature coolant port and adapted to regulate the flow of high-temperature coolant from the high-temperature coolant port toward the surround of the movable temperature sensing member and effect outflow thereof to the mixing compartment.

4 Claims, 9 Drawing Sheets

THERMOSTAT APPARATUS

BACKGROUND OF THE INVENTION

I. Technical Field

The present invention relates to a thermostat apparatus which automatically controls a temperature of a coolant mainly cooling the engine of an automobile.

II. Description of the Related Art

A conventional thermostat apparatus 20, as shown in FIG. 7, has a housing body 16 including a radiator coupling port 2 to let a low-temperature coolant A, cooled by a radiator or the like, flow into a housing body interior 19, a bypass port 3 to let a high-temperature coolant B, heated by the engine, flow into the housing body interior 19, and an engine coupling port 4 to feed out a coolant C, which is a mixture of the coolants flowing through the radiator coupling port 2 and the bypass port 3, to the engine.

The thermostat apparatus 20 also includes a temperature sensitive movable part 8 or a thermally expanding element which moves according to a liquid temperature in the housing body interior 19, a piston shaft 7 which has one end retained in the temperature sensitive movable part 8 and slides in response to thermal expansion or contraction of the thermal extension body, a piston shaft support 6 provided on a radiator coupling port 2 side to support the other end of the piston shaft 7, a main valve 9 which moves together with the temperature sensitive movable part 8 to control the flow-in amount of the low-temperature coolant A into the housing body interior 19 through the radiator coupling port 2, a frame 10 supported by a housing cover 1, a main spring 11 which is provided between the main valve 9 and the frame 10 in a compressed state and urges the main valve 9 toward the radiator coupling port 2, a bypass shaft 12 provided in a direction toward the bypass port 3 from the temperature sensitive movable part 8, a bypass valve 13 which is provided at the bypass shaft 12 and controls the flow-in amount of the high-temperature coolant B into the housing body interior 19 through the bypass port 3, and a bypass spring 14 which is provided between the bypass valve 13 and the temperature sensitive movable part 8 in a compressed state and urges the bypass valve 13 toward the bypass port 3.

When the liquid temperature around the temperature sensitive movable part 8 rises, the thermal extension body sealed in a cup 15 is thermally expanded to push the piston shaft 7. This causes an opening movement of the main valve 9 together with the temperature sensitive movable part 8 against the load of the main spring 11, increasing the flow-in amount of the low-temperature coolant A, and causes a closing movement of the bypass valve 13, reducing the flow-in amount of the high-temperature coolant B.

When the liquid temperature around the temperature sensitive movable part 8 falls, contraction of the thermal extension body occurs, so that the urging force of the main spring 11 pushes back the piston shaft 7, causing the closing movement of the main valve 9 to decrease the flow-in amount of the low-temperature coolant A from the radiator, and increasing the flow-in amount of the high-temperature coolant B.

Through such an operation, the conventional thermostat apparatus 20 detects mainly the liquid temperature of the coolant C or a mixture of the high-temperature coolant B and the low-temperature coolant A from the radiator, controls it, and feeds the coolant C to the engine.

Thermostat apparatuses which have similar configurations and perform similar operations or techniques are disclosed in Japanese Unexamined Utility Model Publication No. Hei 2-5672, Japanese Unexamined Utility Model Publication No. Hei 6-37524, Japanese Unexamined Patent Publication No. Hei 10-19160, Japanese Patent Publication No. Sho 47-16584 and Japanese Unexamined Utility Model Publication No. Sho 61-175534 are proposed.

Japanese Unexamined Utility Model Publication No. Sho 61-175534 discloses the structure such that a coolant guiding cylinder is attached to the foregoing so-called bottom bypass type thermostat so that the coolant from the bypass is guided to the periphery of the temperature sensitive movable part.

SUMMARY OF THE INVENTION

The foregoing conventional thermostat apparatuses have the following drawbacks.

(1) In the housing body interior 19, the bypass port 3 and a deflector 18 are spaced apart from the temperature sensitive movable part 8, and the bypass valve 13 blocks the flow of the high-temperature coolant before the temperature sensitive movable part 8, making it difficult for the high-temperature coolant B to reach the temperature sensitive movable part 8. Therefore, the low-temperature coolant A and the high-temperature coolant B cannot be mixed efficiently at the temperature sensitive movable part 8, making it difficult for the temperature sensitive movable part 8 to detect the temperature of the coolant C. This results in a drawback such that the liquid temperature of the coolant C cooling the engine becomes unstable, and the range of the temperature control in response to a change or the like in engine load becomes great.

Further, when the coolant returning from the circuit for the cabin heater flows into the housing body interior 19, mixing with a higher efficiency cannot be carried out, so that the above drawback is amplified.

Furthermore, the performance of detecting the high-temperature coolant B is poor, so that there is a large possibility of overshooting when the temperature of the entire cooling system rises.

Since the coolant temperature has an upper limit, the normal control liquid temperature should be controlled to a relatively low temperature beforehand, causing a reduction in the combustion efficiency of the engine, and a reduction in fuel consumption originating from increases in the friction loss of the engine and thermal loss.

An increase in the temperature control range of the coolant C in response to a change in engine load brings about the characteristic of the conventional thermostat apparatus as shown in FIG. 8, making the thermal expansion and contraction of the engine greater. If such happens frequently, it would lead to shorter life originating from an increased engine stress, impairing of the engine performance at the time the temperature falls and due to a temperature difference, etc.

(2) Conventionally, at the time the high-temperature coolant B is blocked so that all the high-temperature coolant B is allowed to flow to the radiator, the bypass valve 13 is pressed against the bypass port 3 by the bypass spring 14. However, the load of the bypass spring 14 becomes a load on the temperature sensitive movable part 8. As the load on the temperature sensitive movable part 8 becomes greater, the life of the temperature sensitive movable part 8 inevitably becomes shorter. As the pressure on the thermal extension body becomes higher, the melting point of the thermal extension body rises, so that a high coolant temperature is needed to make the degree of opening of the main valve 9 larger. That is, when the temperature of the coolant C rises, requiring a greater degree of opening of the main valve 9, the degree of opening of the main valve 9 cannot be secured as apparent from the characteristic of the conventional thermostat apparatus as shown in FIG. 9.

(3) At the time of closing the bypass port 3, the bypass port 3 is blocked rapidly, bringing about a problem that temperature hunting occurs immediately after the bypass port 3 is closed, making the temperature of the coolant C instable.

(4) The bypass valve 13 in the conventional thermostat apparatus is structured so as to be closed when its flat disk surface abuts on the entire surface of the bypass port 3. The distance between the bypass valve 13 and the bypass port 3 when the main valve 9 is closed is determined by the following factors:

a: the area of the flow passage of the bypass port 3 for the high-temperature coolant B at the time of closing the main valve 9 is secured, b: the turns of the bypass spring 14 do not touch one another when the temperature sensitive movable part 8 is moved further as the temperature of the coolant C becomes higher after closing the bypass valve 13, and c: the bypass valve 13 and the temperature sensitive movable part 8 do not contact each other.

That is, it is necessary to set a large distance between the bypass valve 13 and the bypass port 3 when the main valve 9 is closed.

This requires a complex structure like the deflector 18 in order to guide the high-temperature coolant B toward the temperature sensitive movable part 8 as much as possible.

Even the "coolant guiding cylinder" disclosed in Japanese Unexamined Utility Model Publication No. Sho 61-175534 causes the high-temperature coolant B to be ejected into the "coolant guiding cylinder" larger in diameter than the flow-in passage for the high-temperature coolant B, provided at the bypass port having a relatively small diameter, from the flow-in passage, so that the high-temperature coolant B flowing in is scattered before contacting the temperature sensitive movable part, thus impairing the temperature and flow rate of the high-temperature coolant B.

Further, the high-temperature coolant B flowing in the "coolant guiding cylinder" is blocked by the bypass valve before the temperature sensitive movable part, and is further scattered to be considerably mixed with the low-temperature coolant A and the coolant C (mixture) turbulently flowing around, so that the original temperature is no longer kept.

When the failure of keeping the original temperature occurs until the high-temperature coolant B reaches the periphery of the temperature sensitive movable part, which causes the foregoing problem, the performance of the temperature sensitive movable part to detect the temperature of the high-temperature coolant B is impaired, bringing about a problem such that there is a large possibility of overshooting when the temperature of the entire cooling system rises. In addition, how the "failure of keeping the original temperature" occurs is not stable depending on the number of rotations of a coolant pump which operates according to the operational state of the engine, so that the liquid temperature control lacks stability.

When the flow rate of the coolant at the top surface of the temperature sensitive movable part is fast, the temperature of the coolant is quickly transmitted to the temperature sensitive movable part. The high-temperature coolant B that has flowed into the "coolant guiding cylinder" loses the original flow rate until it reaches the periphery of the temperature sensitive movable part, so that the performance of the temperature sensitive movable part to detect the temperature of the high-temperature coolant B in good response is impaired accordingly, bringing about the problem such that there is a large possibility of overshooting when the temperature of the entire cooling system rises. Further, the response to a change in the temperature of the coolant caused by a change in the operational state of the engine is impaired, so that the liquid temperature control lacks stability.

As described above, even the "coolant guiding cylinder" does not allow the temperature and flow rate of the high-temperature coolant B to be maintained until the high-temperature coolant B reaches the periphery of temperature sensitive movable part, disabling a sufficient improvement of the temperature detection of the temperature sensitive movable part in response to an abrupt change in the temperature of the coolant, so that the temperature of the coolant cannot be controlled with high accuracy.

The present invention has been made in consideration of the foregoing problems of the conventional thermostat apparatus, and aims at providing a thermostat apparatus capable of accurately controlling the temperature of the coolant. Accordingly, it is an object of the invention to provide a thermostat apparatus which contributes to improving the combustion efficiency of an engine, reducing the friction loss of the engine, and reducing the thermal loss, thereby contributing to reduction in fuel consumption.

To solve the problems, a thermostat apparatus to which the present invention is adapted is characterized in that a conduit for bypassing a high-temperature coolant heated by the engine to the thermostat apparatus is structured so as to extend until the conduit covers all of or a part of the temperature sensitive movable part and to form a high-temperature coolant conduit having an inside diameter commensurate with an outside diameter of the temperature sensitive movable part in such a way as to cause the high-temperature coolant flowing the conduit to directly contact a periphery (bottom surface/side surface) of the temperature sensitive movable part without impairing a temperature and a flow rate of the high-temperature coolant, and then let the high-temperature coolant flow out of an ejection opening.

The present invention with the foregoing structure has the following advantages.

The structure of the high-temperature coolant conduit forms a state where the high-temperature coolant B dominates the area where the temperature sensitive movable part is disposed, thus bringing about advantages to be described below.

According to the present invention, the movement of the temperature sensitive movable part can be controlled mostly by the temperature of the high-temperature coolant alone. It is possible to sufficiently enhance the temperature dominant ratio of the high-temperature coolant to the temperature sensitive movable part and realize the state where the movable state of the temperature sensitive movable part can be controlled upon influence of the temperature of the high-temperature coolant.

Even when the coolant returning from the circuit for the cabin heater flows into the housing body interior (space into which the high-temperature coolant is ejected from the ejection opening of the high-temperature coolant conduit; the same is applied hereunder), the high-temperature coolant conduit and the high-temperature coolant B which has passed the high-temperature coolant conduit guard the coolant from the circuit for the cabin heater, thus making it possible to keep the temperature dominant ratio of the high-temperature coolant to the temperature sensitive movable part.

The "temperature dominant ratio of the high-temperature coolant to the temperature sensitive movable part" is defined by a coefficient a expressed by the following equation. (detecting temperature of temperature sensitive movable part) =a×(high-temperature coolant)+b×(low-temperature coolant)

Even when the coolant returning from the circuit for the cabin heater using the heat of the coolant is returned into the housing body interior, the above equation is basically established.

While the conventional thermostat is an apparatus of mainly detecting the liquid temperature of the coolant C which is a liquid mixture, therefore, the thermostat according to the present invention is transformed to an apparatus which mainly and sufficiently detects the liquid temperature of the coolant at the outlet of the engine (high-temperature coolant B), and supplies the coolant C to the engine in such a way as to keep the liquid temperature of the high-temperature coolant B constant.

Because the transformation is achieved without changing the apparatus positional relationship of the thermostat apparatus in the cooling system, the thermostat apparatus can be realized without significantly modifying the design of the cooling system configured by using the widely prevailing conventional thermostat apparatus.

In general, the maximum temperature of the coolant in the cooling system has a limit and the coolant temperature is set and controlled so as not to exceed the limit. In the cooling system to be installed in an automobile or the like, a portion where the coolant becomes hottest is the outlet of the engine. In the conventional thermostat apparatus, the temperature of the coolant to be supplied to the engine is controlled to a low temperature and supplied thereto beforehand so that the temperature at the outlet of the engine (high-temperature coolant temperature) does not exceed the allowable limit in various operational states. According to the present invention, however, the engine outlet temperature is directly detected and controlled with the foregoing advantages, making it possible to set the coolant temperature as high as the allowable limit. As the coolant temperature at the engine outlet is stably kept at the portion near the high-temperature side allowable limit while increasing or decreasing the temperature of the coolant to be supplied to the engine as needed, the average water temperature in the engine can be set higher than that allowed by the prior art.

This contributes to improving the combustion efficiency of the engine, reducing the friction loss of the engine, reducing the thermal loss, etc., resulting in achievement of reduced fuel consumption of the engine. It is also possible to contribute to improving the performance of the cabin heater or the like.

The foregoing advantages allow the temperature of the high-temperature coolant to be detected stably, and can thus overcome the problem that the temperature of the coolant cooling the engine becomes instable and realize stable control of the coolant temperature around the high-temperature coolant. This can suppress thermal expansion or contraction originating from a change in the temperature of the coolant of the engine, thus achieving reduction of stress on the engine.

Those advantages can be provided specifically by the coolant temperature characteristic during automobile driving, as shown in FIG. 8, obtained by the present invention.

Data shown in FIG. 8 is the progress of the engine outlet temperature (high-temperature coolant temperature) recorded when the test was conducted in the same drive mode in cases of installing the conventional thermostat apparatus described referring to FIG. 7 and the thermostat apparatus according to the present invention in the same automobile while the other conditions are set to be identical.

For an exemplified description, for an automobile which behaves as shown in FIG. 8, a coolant temperature T° C. (e.g., 97° C.) at the engine outlet in the cooling system is an ideal value for the coolant temperature at which the engine operates at the highest efficiency and lowest fuel consumption. That is, it is ideal that the engine operates at the constant engine outlet coolant temperature of 97° C.

In the conventional thermostat apparatus, the coolant temperature at the engine outlet considerably varies at a temperature difference between $T_{max}$° C. (e.g., 100° C.) and $T_2$° C. (e.g., 88° C.) because mainly the state of mixture of the low-temperature coolant and the high-temperature coolant is instable and changes mainly in synchronization with the load state of the engine and then in accordance with a change in the flow state of the coolant in the housing body interior, so that the coolant temperature around the temperature sensitive movable part which is detected by the temperature sensitive movable part is instable.

According to the thermostat apparatus of the present invention, the coolant temperature at the engine outlet stably transitions at a temperature difference between $T_{max}$° C. (e.g., 100° C.) and $T_1$° C. (e.g., 95° C.).

The coolant temperature at the engine outlet (high-temperature coolant temperature) is considered as an index indicative of the necessary degree of cooling of the engine, and direct detection of the engine outlet temperature is direct recognition of the necessary amount of cooling of the engine by the thermostat apparatus, enabling an improvement on the response that has been difficult for the conventional thermostat apparatus which mainly detects the temperature of a liquid mixture.

Paying attention to the positional relationship between the high-temperature coolant conduit and the temperature sensitive movable part, in the aspect where the temperature of the high-temperature coolant rises, the piston shaft protracts, so that the temperature sensitive movable part enters the high-temperature coolant conduit, increasing the "temperature dominant ratio of the high-temperature coolant to the temperature sensitive movable part", quickening the response of the operation (opening operation of the main valve) in the direction of demonstrating the cooling performance needed by the engine outlet temperature, whereas in the aspect where the temperature of the high-temperature coolant falls, the piston shaft is pushed back, so that the temperature sensitive movable part moves outside from inside the high-temperature coolant conduit, decreasing the "temperature dominant ratio of the high-temperature coolant to the temperature sensitive movable part", quickening the response of the operation (closing operation of the main valve) in the direction of suppressing the cooling performance needed by the engine outlet temperature. The above mechanically improves the response of the temperature sensitive movable part to the high-temperature coolant B.

Even in case of reducing the amount of the high-temperature coolant flowing in the bypass circuit, the sensitivity to the temperature of the high-temperature coolant is high so that the performance of the present invention can be demonstrated sufficiently.

The advantages described above make it unnecessary to take the complex structure of the deflector 18 as discussed in the problem (4) of the conventional thermostat apparatus.

Because the main valve 9 of the conventional thermostat apparatus is characterized in that it starts opening while tilting in a direction defined by the end position of the main spring 11, the characteristic in the cooling system differs depending on the end position of the main spring. By way of contrast, because the high-temperature coolant conduit sufficiently guards the action of the low-temperature coolant flowing in from the main valve on the temperature sensitive movable part, the characteristic of the thermostat apparatus of the present invention in the cooling system is hardly influenced by the end position of the main spring. The subject matter recited in at least one embodiment of the present invention can suppress the inclination of the main valve itself.

The provision of the high-temperature coolant conduit can add a function of "restricting the passage for the high-temperature coolant", bringing about an effect of eliminating the need for the bypass spring 14 of the conventional thermostat apparatus which presses the bypass valve 13 against the bypass port 3, and providing single urging means for urging the main valve toward the low-temperature coolant port.

Disposing the single urging means outside the high-temperature coolant conduit makes it possible to create a state where no urging means is present in the area between the high-temperature coolant conduit 42 and the temperature sensing portion of the temperature sensitive movable part.

Further, "providing single urging means" brings about an effect of reducing the load applied when the piston shaft is pushed into the temperature sensitive movable part to the urging force of only single urging means.

FIG. 9 shows the effect of reducing the urging force in the form of the characteristics of the "coolant temperature vs. degree of opening of the main valve" of the conventional thermostat apparatus and the thermostat apparatus according to the present invention in comparison with each other.

That is, since the conventional thermostat apparatus closes the bypass port with the bypass valve, and then applies double urging forces provided by the main spring and the bypass spring, the pressure acting on the thermal extension body in the temperature sensitive movable part becomes higher, raising the melting point of the thermal extension body, so that setting a large degree of opening of the main valve requires a higher coolant temperature, causing a change in the degree of opening of the main valve with respect to the temperature of the coolant having a transition point. By way of contrast, since the thermostat apparatus according to the present invention uses a single urging force, so that a change in the degree of opening of the main valve with respect to the coolant temperature is smooth, achieving more accurate control of the coolant temperature. In addition, a large degree of opening of the main valve can be taken at a relatively low coolant temperature, so that when the coolant temperature becomes high, the cooling performance of the radiator can be demonstrated sufficiently, thus preventing the overshooting of the coolant temperature.

The reduction in urging force reduces the load applied to the temperature sensitive movable part, thereby realizing an elongated life thereof.

As the load applied to the temperature sensitive movable part can be reduced, a smaller temperature sensitive movable part can be used, so that making the temperature sensitive movable part compact makes the response (response to a change in the temperature of the coolant) higher, making it possible to ensure more stable control of the temperature of the coolant and miniaturization-oriented cost reduction.

According to the subject matter recited in one embodiment of the present invention, the coaxial structure comprising a piston shaft, temperature sensitive movable part and extension shaft takes a two-point support structure supporting at a piston shaft support and a support guide part spaced apart from the piston shaft support, and does not guide the side surface of the temperature sensing portion of the temperature sensitive movable part, but guides the extension shaft with the support guide part. This makes it possible to set the clearance between the extension shaft and the support guide part smaller, bringing about an effect that the fluctuation range of the temperature sensitive movable part caused by the vibration of the engine, pulsation of the coolant and the driving vibration can be made smaller.

This makes the movements of the temperature sensitive movable part and the main valve smoother and reduces stress to achieve longer life of the thermostat apparatus.

BRIEF DESCRIPTION OF THE DRAWINGS

A thermostat apparatus adaptable at the time of controlling the coolant temperature of the engine of an automobile, as the best mode of carrying out the present invention, will be elaborated below with reference to the accompanying drawings, in which.

DETAILED DESCRIPTION OF THE INVENTION

Figure 1:
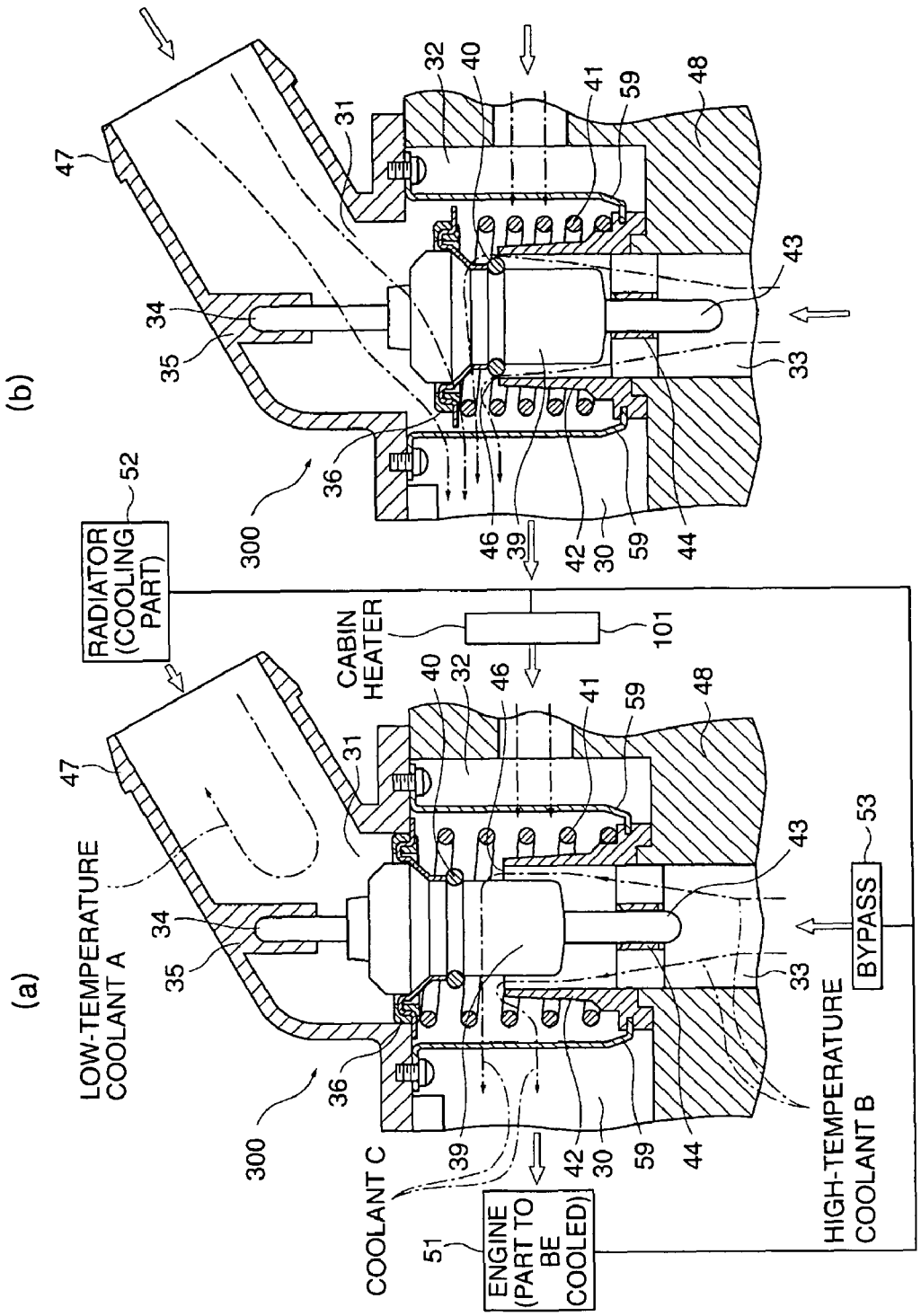
FIG. 1 is a first embodiment of the present invention and an example where a projection is provided.

FIG. 1 shows the configuration of a thermostat apparatus 300 as a first embodiment of the present invention.

The thermostat apparatus 300 is included in a so-called inlet control type in which a low-temperature coolant A cooled at a radiator 52 and a high-temperature coolant B supplied via a bypass 53 from an engine 51 flow into the thermostat apparatus 300, and the temperature of a coolant C which is let to flow into the engine 51 is controlled by controlling the ratio of the mixture thereof.

That is, the control system includes a bypass port 33 to which the high-temperature coolant B having passed the engine 51 is supplied via the bypass 53, and a radiator coupling port 31 to which the low-temperature coolant A that is a part of the high-temperature coolant B having passed the engine 51 and cooled at the radiator 52 is supplied from the radiator 52, and the low-temperature coolant A and the high-temperature coolant B are mixed in a housing body interior 32 to produce the coolant C. The produced coolant C is supplied to the engine 51 via the engine coupling port 30.

The feature of the thermostat apparatus 300 lies in that a state where the movable state of the temperature sensitive movable part can be realized only by mostly the temperature of the high-temperature coolant, so that the thermostat apparatus 300 can operate to make the temperature of the high-temperature coolant B flowing out from the engine 51 constant.

A cabin heater 101 is provided on a halfway between the bypass 53 and the radiator 52.

In executing this control, the thermostat apparatus 300 further has a housing body 48 and a housing cover 47 attached thereto to form its casing. The housing body 48 has an internal shape corresponding to the bypass port 33 and the engine coupling port 30. The housing cover 47 also has an internal shape corresponding to the radiator coupling port 31. The housing body 48 and the housing cover 47 are each made of aluminum (die-cast), plastics or the like.

The thermostat apparatus 300 includes a temperature sensitive movable part 39, a piston shaft 34 having one end retained in the temperature sensitive movable part 39, a piston shaft support 35 which is provided on the radiator coupling port 31 side and supports the other end of the piston shaft 34, a main valve 36 integrally attached to the temperature sensitive movable part 39, a spring 41 which urges the main valve 36 toward the radiator coupling port 31, and a high-temperature coolant conduit 42 projecting toward the housing body interior 32 from the bypass port 33 and coupled toward the housing body interior 32 from the bypass port 33 via an ejection opening 46, and further has an extension shaft 43 extending from the temperature sensitive movable part 39 toward the bypass port 33, and a support guide part 44 formed in the high-temperature coolant conduit 42 to support and guide the extension shaft 43.

The material for the high-temperature coolant conduit 42 is, for example, a resin, which is not restrictive. The upper end of the high-temperature coolant conduit 42 is positioned above the lower end of the temperature sensitive movable part 39, as shown in FIG. 1. As a result, the lower end of the temperature sensitive movable part 39 enters the high-temperature coolant conduit 42. The "above" here is equivalent to the position of the radiator coupling port 31 side, while the "under" is equivalent to the position of the bypass port 33 side. The same is applied in the following description.

The inside diameter of the high-temperature coolant conduit 42 is set wider than the outside diameter of the temperature sensitive movable part 39. Consequently, at the time the distal end of the temperature sensitive movable part 39 is inserted into a tube constituting the high-temperature coolant conduit 42, it is inserted in a so-called loosely insertable state with some spatial margin provided between the inner wall of the high-temperature coolant conduit 42 and the outer wall of the temperature sensitive movable part 39.

It is to be noted that the spring 41 is fitted over the outer surface of the high-temperature coolant conduit 42. A frame 59 is further embedded in the high-temperature coolant conduit 42, and has one end fixed to the housing cover 47. The structure of the frame 59 may be omitted.

The support guide part 44 has its outer periphery formed on the inner wall of the high-temperature coolant conduit 42. The support guide part 44 has unillustrated holes formed therethrough at upper and lower surfaces, so that through the unillustrated holes, the high-temperature coolant B flows from the bypass port 33 toward the ejection opening 46 and flows out to the housing body interior 32.

The operation of the thermostat apparatus 300 with the foregoing configuration will be described next. When a hot high-temperature coolant B heated by the engine 51 is supplied to the bypass port 33, the high-temperature coolant B is fed to the high-temperature coolant conduit 42. The high-temperature coolant conduit 42 can cause the fed high-temperature coolant B to directly contact the periphery of the temperature sensitive movable part 39. The temperature sensitive movable part 39 is loosely fitted in the high-temperature coolant conduit 42 beforehand, with a predetermined clearance previously formed between the temperature sensitive movable part 39 and the high-temperature coolant conduit 42. The high-temperature coolant B flows out to the housing body interior 32 through the clearance formed between the temperature sensitive movable part 39 and the high-temperature coolant conduit 42. This can allow the high-temperature coolant B to directly contact the periphery (bottom surface/side surface) of the temperature sensitive movable part 39 without impairing the temperature and flow rate thereof, thereby transmitting heat. Accordingly, the temperature sensitive movable part 39 can detect the temperature of the high-temperature coolant B with a high efficiency, so that the temperature sensitive movable part 39 can be moved according to the temperature of the high-temperature coolant B.

The high-temperature coolant B which has flowed out into the housing body interior 32 from the ejection opening 46 first flows so as to surround the temperature sensitive movable part 39. This can form a state where the high-temperature coolant B dominates the area where the temperature sensitive movable part 39 is disposed.

As the main valve 36 is urged toward the radiator coupling port 31 by the spring 41, the radiator coupling port 31 and the housing body interior 32 are blocked from each other when the temperature sensitive movable part 39 is not driven. When a high-temperature coolant B with a predetermined temperature or higher is supplied into high-temperature coolant conduit 42, on the other hand, the temperature sensitive movable part 39 is driven toward the bypass port 33, so that the main valve 36 is opened against the load of the spring 41, making it possible to increase the flow-in amount of the low-temperature coolant A to the housing body interior 32 from the radiator coupling port 31. As a result, the flow-in amount of the low-temperature coolant A to the housing body interior 32 from the radiator coupling port 31 can be controlled according to the temperature of the high-temperature coolant B.

Figure 2:
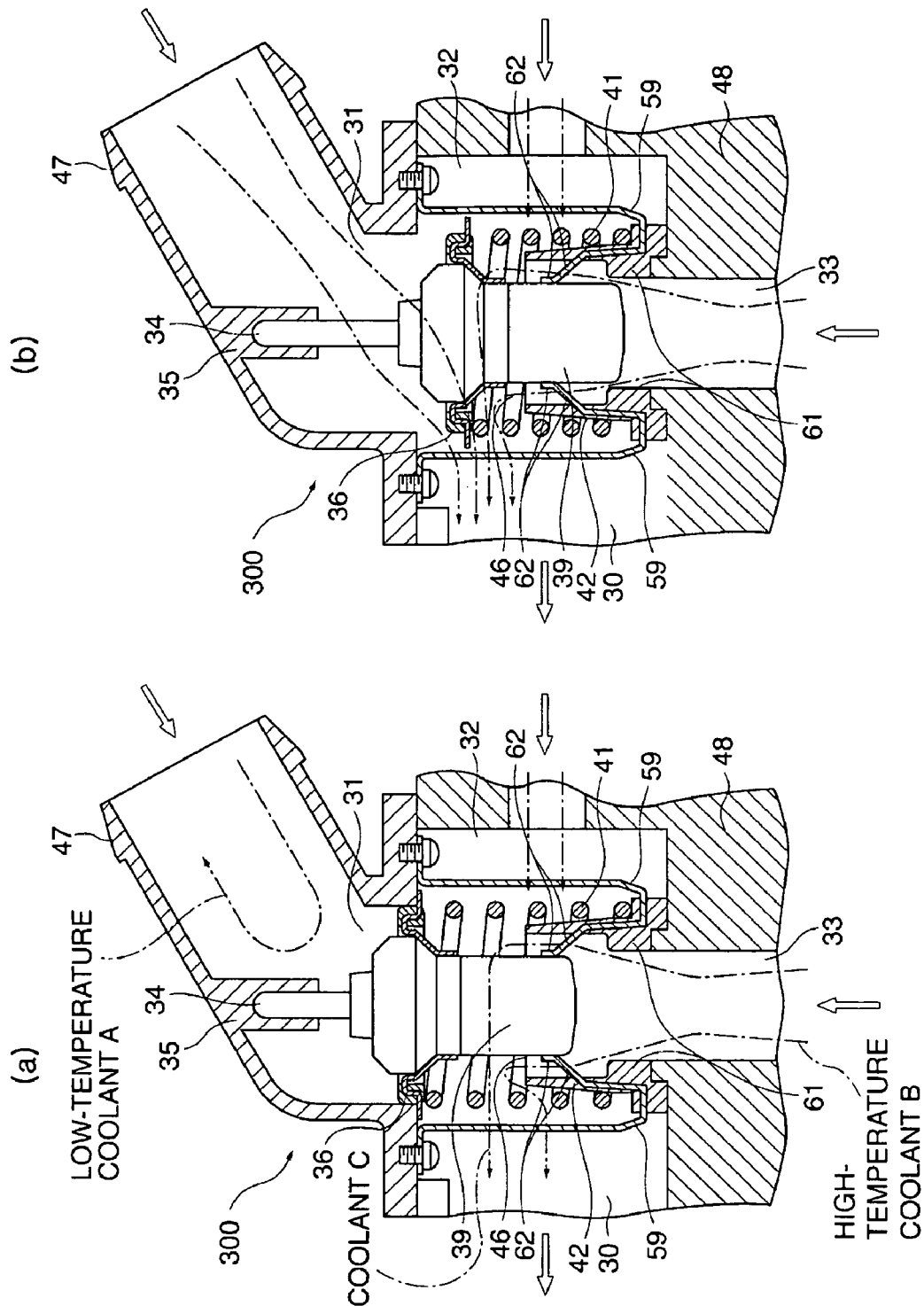
FIG. 2 is a second embodiment of the present invention.

The thermostat apparatus 300 to which the present invention is adapted may be configured so that the temperature sensitive movable part 39 is inserted and guided into a support guide part 62 inside the high-temperature coolant conduit 42 as in a second embodiment shown in FIG. 2. With regard to those components and members in FIG. 2 and subsequent drawings, which are similar to the corresponding components and members in FIG. 1, same reference numerals are given to omit their descriptions below.

The support guide part 62 is formed by bending, press-working, etc. of a steel member, and is configured so as to be able to support and guide the side surface of the temperature sensitive movable part 39 disposed in an insertable manner. The support guide part 62 may be integrated with the aforementioned auxiliary fitting 59, or may be spaced apart therefrom. Multiple holes not shown are provided in the support guide part 62. The high-temperature coolant B passes through the unillustrated holes.

Figure 3:
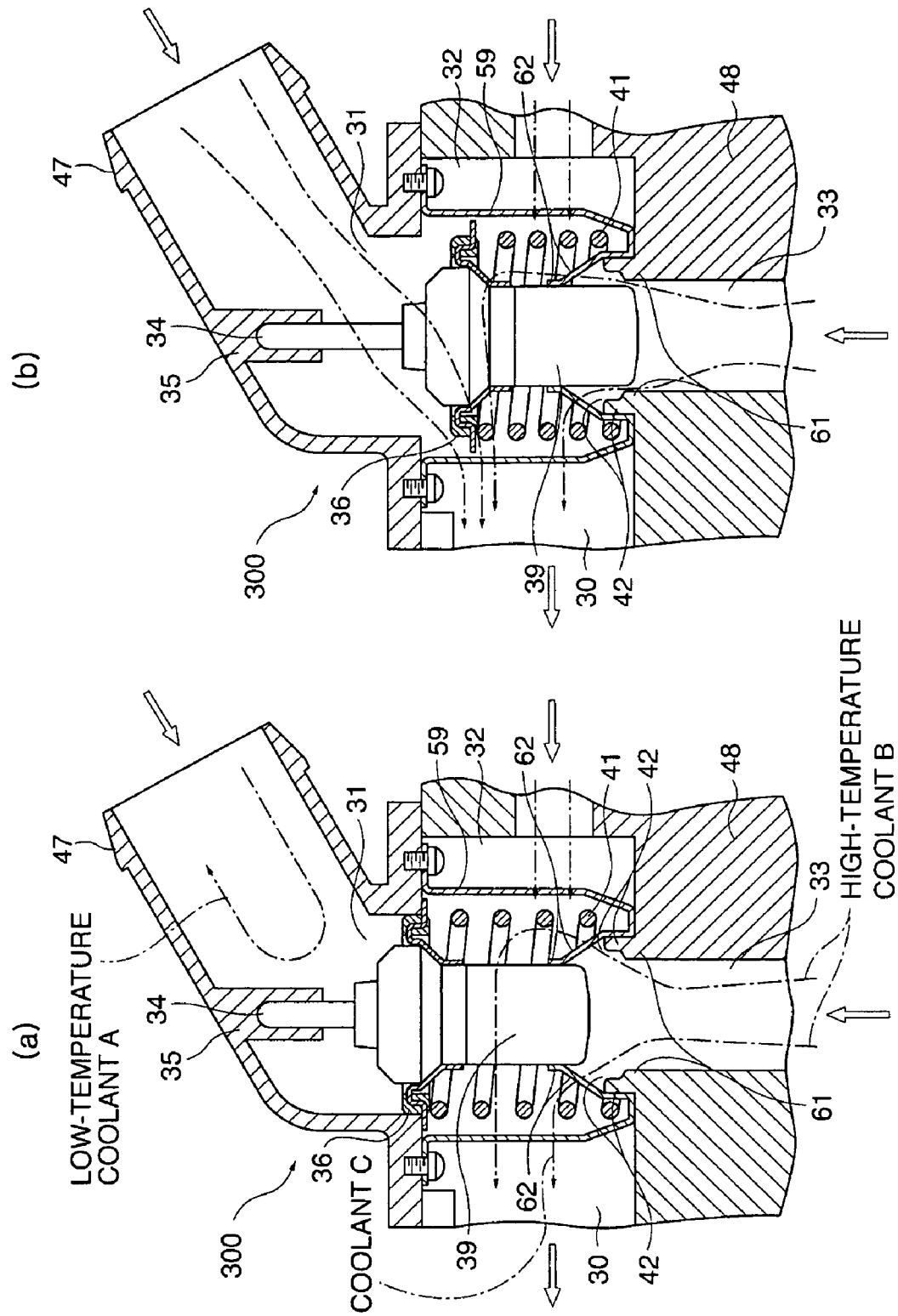
FIG. 3 is a third embodiment of the present invention.

The thermostat apparatus 300 to which the present invention is adapted may be adapted to a third embodiment shown in FIG. 3.

In the embodiment shown in FIG. 3, the high-temperature coolant conduit 42 is formed by a combination of a high-temperature coolant inlet passage of the housing body 48 and the support guide part 62, the ejection opening 46 is formed in the support guide part 62, and the temperature sensitive movable part 39 is supported and guided to the support guide part 62.

The support guide part 62 is provided with a plurality of unillustrated holes=ejection openings 46, so that the high-temperature coolant B supplied from the bypass port 33 directly contacts the periphery (bottom surface/side surface) of the temperature sensitive movable part 39, thereby transmitting heat, and then flows into the housing body interior 32 through the ejection openings 46. This can realize a simple and compact structure while keeping the function of the high-temperature coolant conduit.

The thermostat apparatus 300 to which the present invention is adapted may have a projection 40 formed on the outer surface of the temperature sensitive movable part 39 and corresponding in shape to the clearance between the temperature sensitive movable part 39 and the high-temperature coolant conduit 42 as shown in, for example, FIG. 1. When a hot high-temperature coolant B is supplied, the temperature sensitive movable part 39 is driven toward the bypass port 33 as shown in FIG. 1(b), and the projection 40 is likewise shifted toward the bypass port 33 accordingly. Consequently, the clearance formed between the temperature sensitive movable part 39 and the high-temperature coolant conduit 42 can be narrowed by the projection 40, making it possible to narrow the passage for the high-temperature coolant B to the housing body interior 32. As a result, the flow amount of the high-temperature coolant B from the bypass port 33 to the housing body interior 32 can be reduced. Therefore, the ratio of the mixture of the high-temperature coolant B from the engine 51 and the low-temperature coolant A from the radiator 52 can also be controlled by the provision of the projection 40. When the temperature of the high-temperature coolant B is high, a larger amount of the high-temperature coolant B can be supplied to the radiator 52 to maximize the cooling performance, which can be realized by a simple structure.

Figure 4:
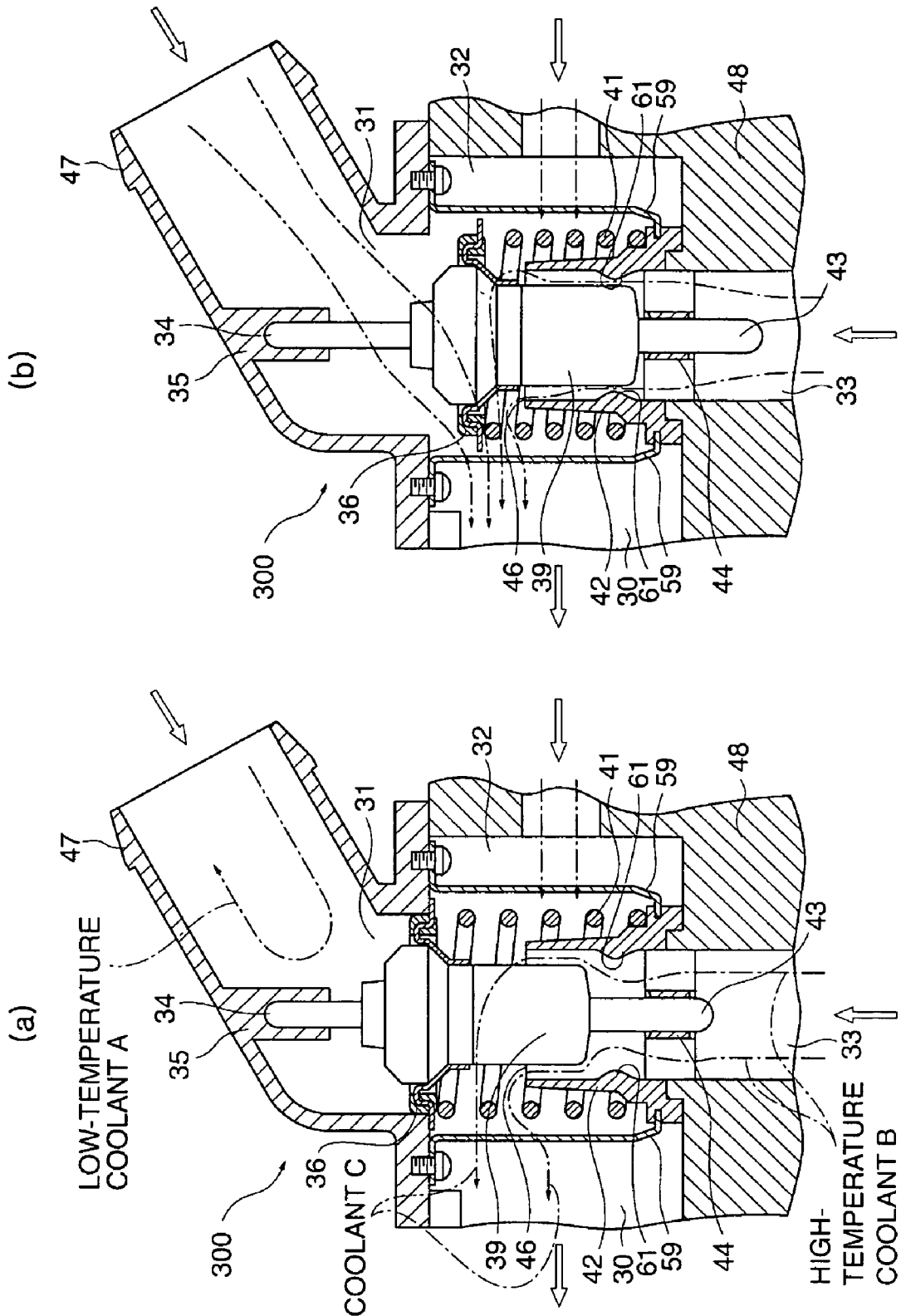
FIG. 4 is an example of a small-diameter portion according to the present invention.

The thermostat apparatus 300 to which the present invention is adapted may have a small-diameter portion 61 narrowed inward and formed on the inner wall of the high-temperature coolant conduit 42 as shown in, for example, FIG. 4. Accordingly, the clearance between the temperature sensitive movable part 39 and the high-temperature coolant conduit 42 can be freely restricted according to the driving of the temperature sensitive movable part 39.

As a result, the flow amount of the high-temperature coolant B to the housing body interior 32 from the bypass port 33 can be reduced, so that a larger amount of the high-temperature coolant B can be supplied to the radiator 52 to maximize the cooling performance. The ratio of the mixture of the high-temperature coolant B from the engine 51 and the low-temperature coolant A from the radiator 52 can also be controlled by the small-diameter portion 61.

Furthermore, the flow rate of the high-temperature coolant B can be made not to be impaired significantly by narrowing the flowing clearance of the high-temperature coolant B around the temperature sensitive movable part 39 while suppressing the flow-in amount of the high-temperature coolant B to the housing body interior 32 from the bypass port 33. This can more reliably keep the state where the high-temperature coolant B dominates the area where the temperature sensitive movable part 39 is disposed, even with the flow amount of the high-temperature coolant B in the high-temperature coolant conduit 42 being suppressed.

Because the small-diameter portion 61 can be formed in various forms, such as a tapered form, a recessed and curved form, and a projecting and curved form, it is possible to tune the flow-in amount of the high-temperature coolant B in such a way as to adequately and gradually restrict the flow-in amount thereof at the time the flow passage for the high-temperature coolant B is restricted by the ingress of the temperature sensitive movable part 39. When the flow passage for the high-temperature coolant B is restricted or when the bypass port 33 and the housing body interior 32 are completely blocked, the thermostat apparatus does not cause temperature hunting of the coolant and can achieve stable coolant temperature control as compared with the conventional thermostat apparatus.

Figure 5:
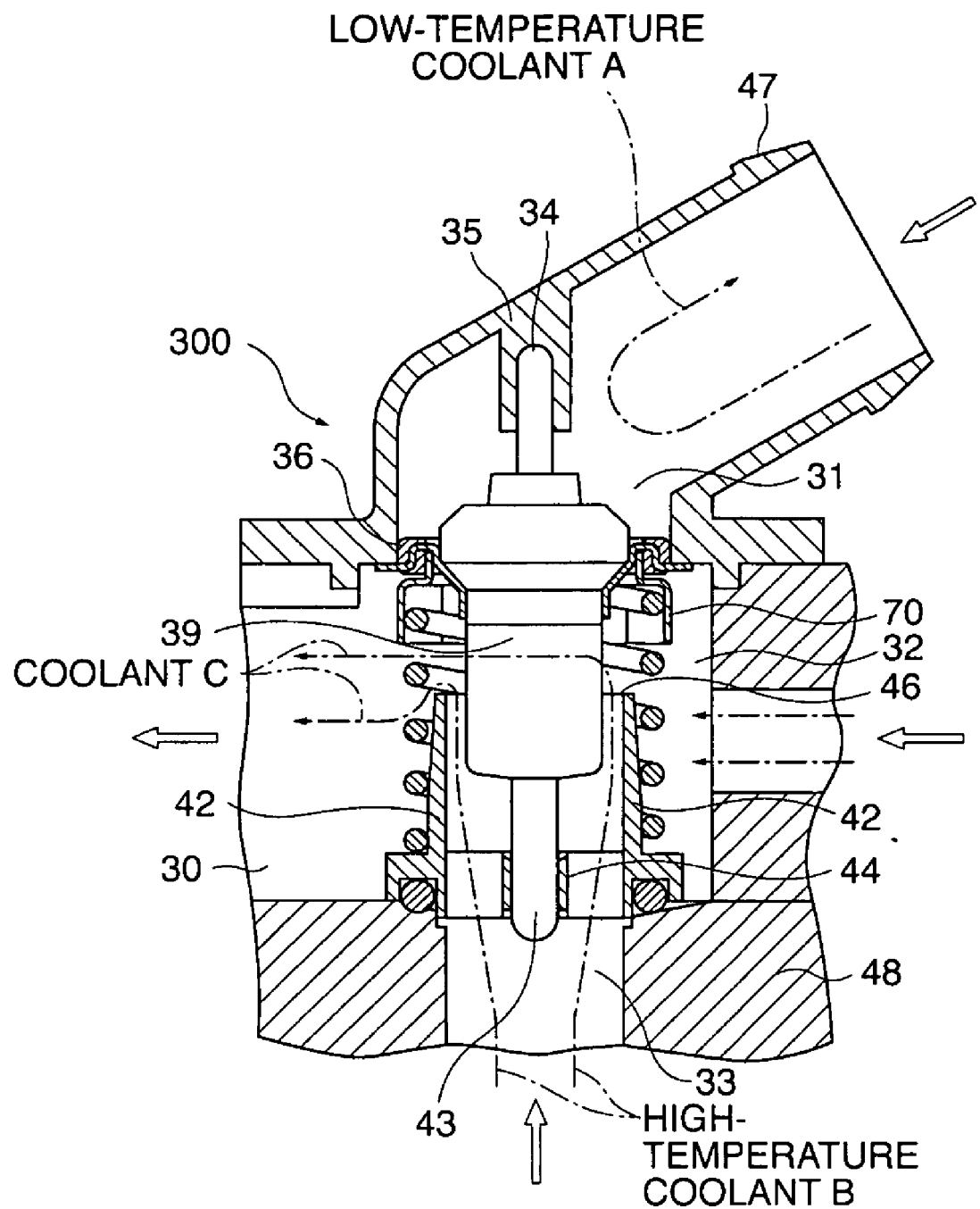
FIG. 5 is an example of a deflector according to the present invention.

The thermostat apparatus 300 to which the present invention is adapted may be adapted to a mode as shown in FIG. 5, for example.

The mode shown in FIG. 5 further has a deflector 70 extending from the main valve 36. The deflector 70 is disposed in such a way as to surround the temperature sensitive movable part 39 from a position spaced apart from the outer periphery of the temperature sensitive movable part 39. Although the deflector 70 is disposed outside the spring 41 in FIG. 5, which is not restrictive, the deflector 70 can be provided inside the spring 41. The provision of the deflector 70 can allow the high-temperature coolant B, led along the inner wall of the high-temperature coolant conduit 42, to directly contact the periphery of the temperature sensitive movable part 39 more reliably. The presence of the deflector 70 can guard the low-temperature coolant A so that the low-temperature coolant A does not contact the temperature sensitive movable part 39 carelessly.

The structure may be modified in such a way that when the temperature sensitive movable part 39 is driven, the flow of the high-temperature coolant B out of the housing body interior is restricted by the positional relationship between the lower end portion of the deflector 70 and the upper end portion of the high-temperature coolant conduit 42. Consequently, the flow amount of the high-temperature coolant B to the housing body interior 32 from the bypass port 33 can be reduced. Therefore, the ratio of the mixture of the high-temperature coolant B from the engine 51 and the low-temperature coolant A from the radiator 52 can also be controlled by the provision of the deflector 70. When the temperature of the high-temperature coolant B is high, a larger amount of the high-temperature coolant B can be supplied to the radiator 52 to maximize the cooling performance.

A thermostat apparatus 400 to which the present invention is adapted is not limited to a case where the foregoing control is executed, but may be adapted in executing control at the outlet.

Figure 6:
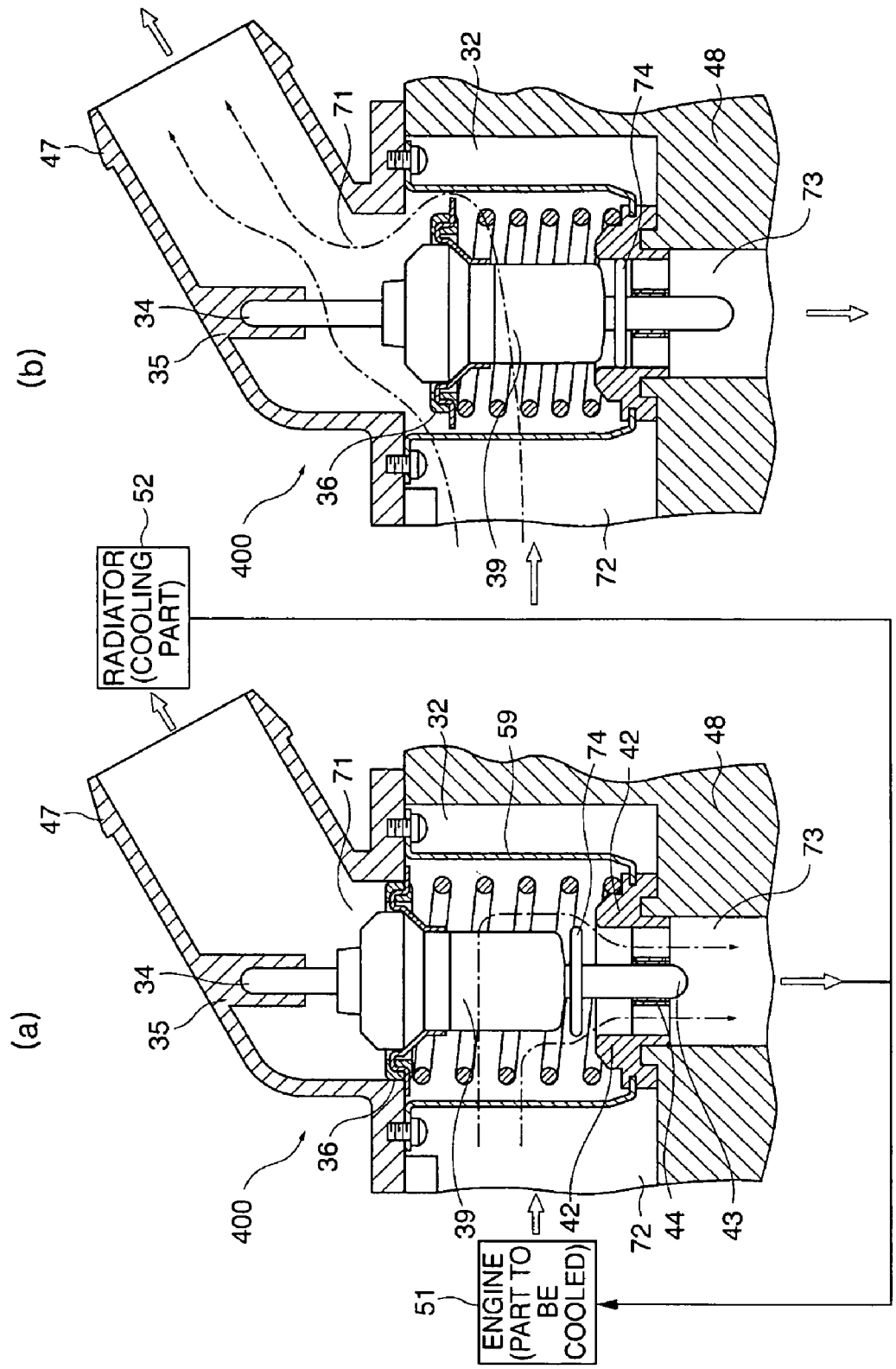
FIG. 6 is an embodiment of an outlet control according to the present invention.
Figure 7:
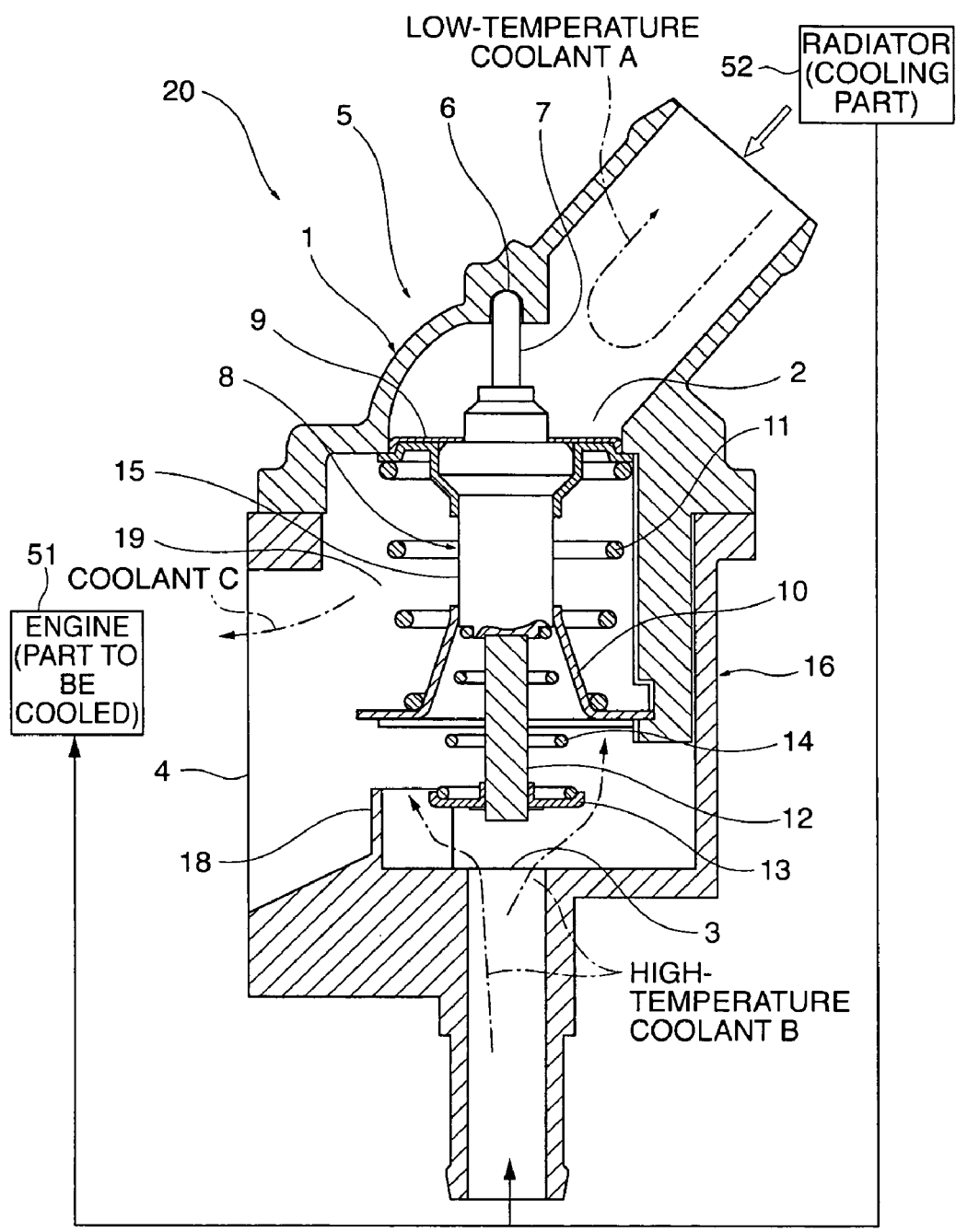
FIG. 7 is a configurational example of the conventional thermostat apparatus.
Figure 8:
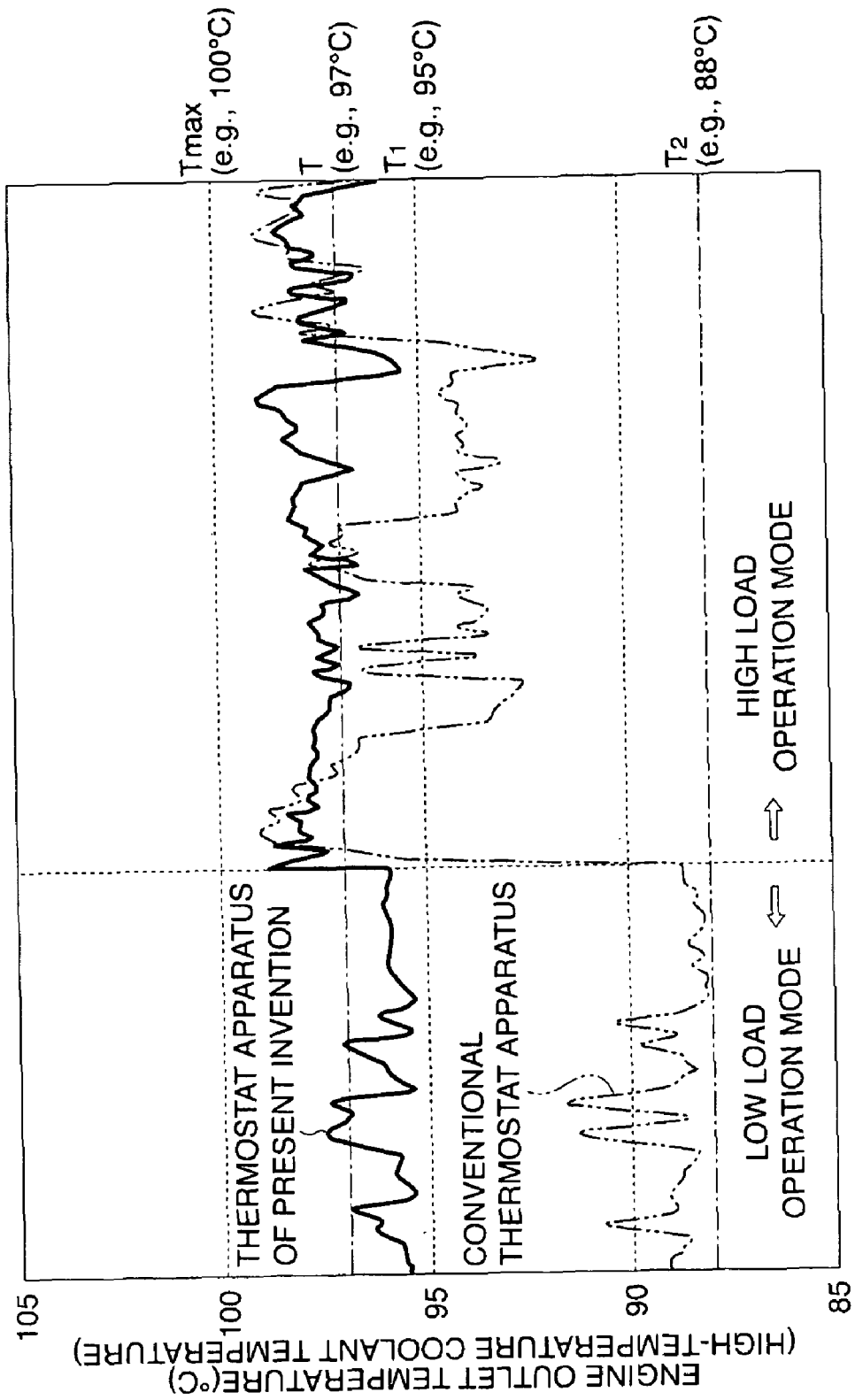
FIG. 8 is a relationship among outlet temperatures in individual loaded operation modes.
Figure 9:
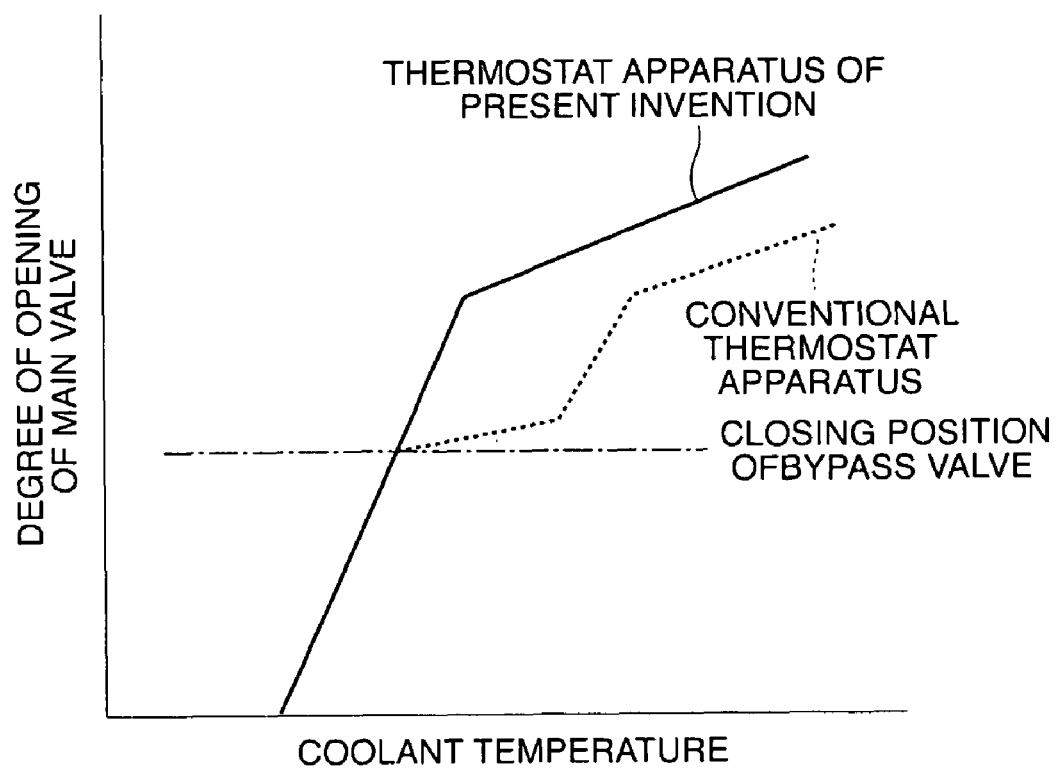
FIG. 9 is a relationship of the degree of opening of the main valve with respect to coolant temperature.

FIG. 6 shows the configuration of the thermostat apparatus 400 adapted in executing the outlet control. The thermostat apparatus 400 has an engine coupling port 72 for letting a high-temperature coolant heated in the engine 51 flow inside, a bypass port 73 to return the coolant to the engine 51, and a radiator coupling port 71 to feed out the coolant to the radiator. With regard to those components and members in the thermostat apparatus 400 shown in FIG. 6, which are similar to the corresponding components and members in FIG. 1, same reference numerals are given to omit their descriptions below.

The thermostat apparatus 400 shown in FIG. 6 further has a bypass valve 74 attached to the extension shaft 43. The formation of the bypass valve 74 can allow the flow passage to the bypass port 73 to be closed by the bypass valve 74 according to the driving of the temperature sensitive movable part 39 as shown in FIG. 6(b). This makes it possible to control the flow amount.

The high-temperature coolant conduit 42 is structured in a cylinder shape with the height adjusted to such an extent that the temperature sensitive movable part 39 is exposed to the high-temperature coolant flowing from the engine coupling port 72, regardless of the drive state of the temperature sensitive movable part 39. Therefore, the high-temperature coolant supplied from the engine coupling port 72 directly contacts the temperature sensitive movable part 39 to transmit heat, and the temperature sensitive movable part 39 can be driven upward or downward freely based on mainly the temperature of the high-temperature coolant.

The invention claimed is:

1. A thermostat apparatus in a coolant circuit of an engine, said apparatus comprising:
    a temperature sensitive movable part including a thermal extension body configured to thermally expand to contract in response to a change in temperature of a coolant, and a piston shaft having one end retained in the temperature sensitive movable part and being configured to slide in response to the thermal expansion or contraction of the thermal extension body, a main valve of the thermostat apparatus being opened or closed when the piston shaft is driven; and a conduit configured so as to bypass a high-temperature coolant heated by the engine to the thermostat apparatus, the conduit being configured so as to extend until the conduit covers all of or a part of the temperature sensitive movable part and form a high-temperature coolant conduit having an inside diameter commensurate with an outside diameter of the temperature sensitive movable part so as to cause the high-temperature coolant flowing through the conduit to directly contact a periphery of the temperature sensitive movable part without impairing a temperature and a flow rate of the high-temperature coolant, and let the high-temperature coolant flow out of an ejection opening.

2. The thermostat apparatus according to claim 1, wherein the temperature sensitive movable part includes an extension shaft configured to be supported and guided to a support guide part in the high-temperature coolant conduit.

3. The thermostat apparatus according to claim 1, wherein the temperature sensitive movable part is configured and arranged to be inserted and guided to a support guide part in the high-temperature coolant conduit.

4. The thermostat apparatus according to 1, wherein the high-temperature coolant conduit has a small-diameter portion configured so as to inwardly narrow, and a clearance between the temperature sensitive movable part and the high-temperature coolant conduit is freely restricted according to driving of the temperature sensitive movable part.

* * * * *